Patented Jan. 15, 1935

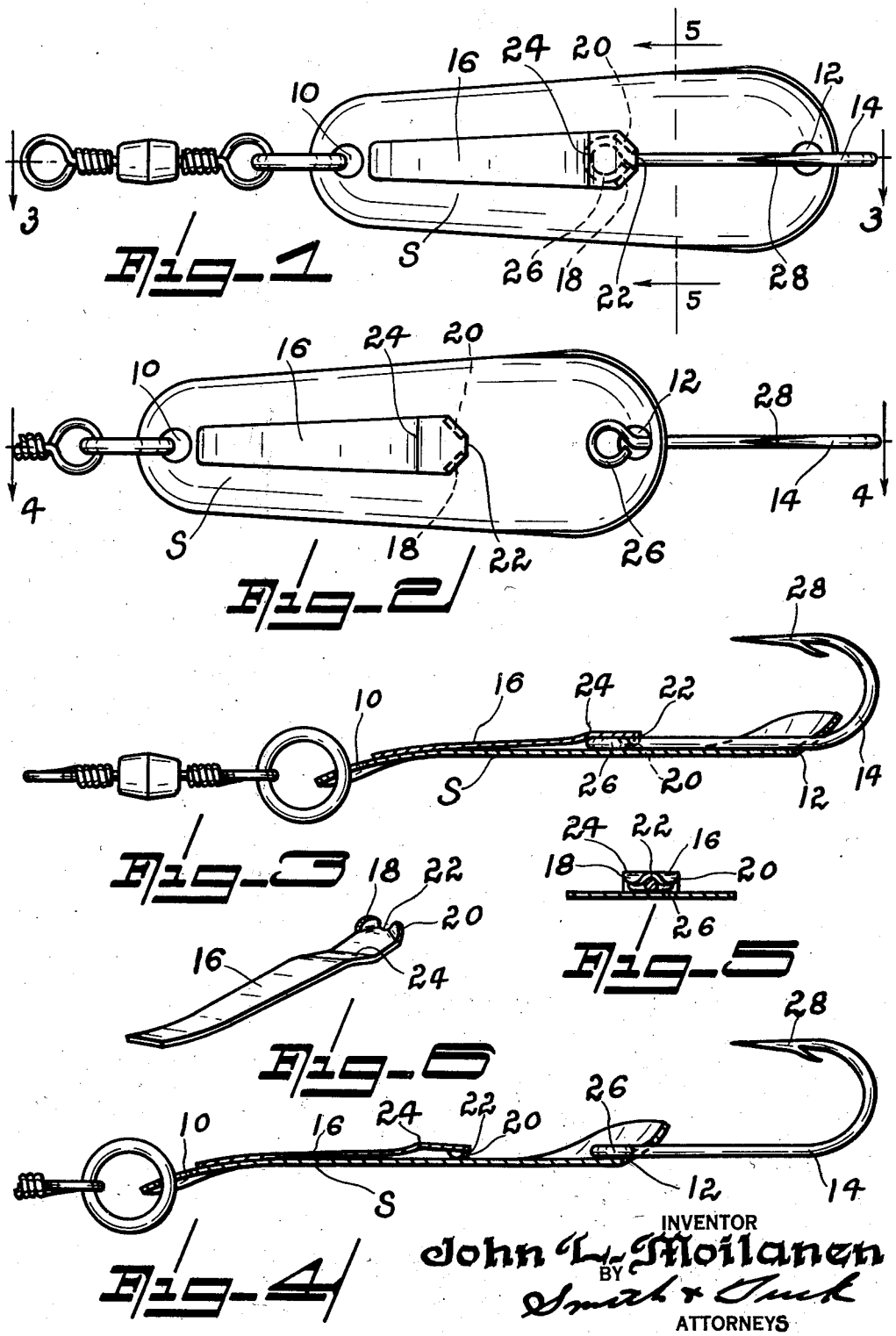

1,987,839

UNITED STATES PATENT OFFICE 1,987,839

HOOK SECURING ATTACHMENT

John L. Moilanen, Seattle, Wash.

Application August 22, 1932, Serial No. 629,934

1 Claim. (Cl. 43—45)

My present invention relates to the art of fishing or trolling spoons and more particularly to a hook securing attachment for such trolling devices.

It is a well known fact that fish when they strike a spoon which has attracted their attention naturally strike at the spoon itself. As a result many fish are lost where the hook secured to the spoon is trailing behind the same and further, quite often the trailing hook seriously affects the proper functioning of the spoon in question. For this reason it is desirable to have the hook practically contained within the outline of the spoon. It has further been found desirable to have the hook so arranged with relation to the spoon that it will be released momentarily and allowed to travel along the spoon for a short distance, the movement of the hook being finally abruptly halted so that the hook will be securely set into the fish.

I am aware that efforts have been made to provide means for the accomplishment of this purpose. In each instance, however, it has been found necessary to use a specially constructed spoon or to completely mutilate the standard type of spoon and further it has been found necessary to employ the various sliding lugs, locks, slots and the like to accomplish this purpose. With my present invention it is only necessary to provide a small spring attachment and then to use any desired spoon with its ordinary hook. This enables a fisherman to use his favorite lure and to arrange the same after the principles of my invention.

Therefore, the principal object of my invention is to provide an attachment which may be secured to any desired trolling spoon and which will hold the hook relatively securely in the most desirable position yet in such a manner as to release the same when a fish strikes the spoon.

A further object of my invention is to provide hook securing means which will hold the hook fixed with the plane of the hook disposed in a definite fixed relationship with the plane of the spoon.

Other and more specific objects will be apparent from the following description taken in connection with the accompanying drawing, wherein Figure 1 is a top plan view of a trolling spoon with my device in place and with the hook in its retracted position.

Figure 2 shows my device on the same spoon but with the hook released as it would be if a fish struck the spoon.

Figure 3 is a sectional view taken along the line 3—3 of Figure 1.

Figure 4 is a similar sectional view taken along the line 4—4 of Figure 2.

Figure 5 is a cross sectional view taken along the line 5—5 of Figure 1.

Figure 6 is a perspective view showing the under side of my attachment.

Referring to the drawing, throughout which like reference characters indicate like parts, S designates the body of any of the common one piece metal spoons such as are used for trolling and the like. This body is provided with the usual leading hole 10 to which the usual ring and swivel for attaching the line are secured. At the rear, the spoon is provided with the hook attaching opening 12 which may be of any standard form used for this purpose. I have shown one form of my attachment as secured to probably one of the most common types of spoon, that which is known as the swimming type, in that it normally rides on its edge as it goes thru the water. I would not care to have my attachment limited to this type of spoon however. It will work equally well on any of the wobbling, darting or revolving types of spoon with equal ease. Disposed within opening 12 is the usual fish hook 14. Now it has been common practice to so proportion the size of shank of hook 14 that the barbed end of the hook will pass thru hole 12 yet the ringed end of the hook will be too large to pass there thru.

Secured substantially towards the forward end of the spoon is my hook securing device or attachment 16. This is composed of a portion near the forward end which must of necessity be made to lie flat against the spoon. If the spoon had a V shape at this point or rounded shape it would be necessary to form my attachment in the same manner so that closed engagement could be obtained. This is due to the fact that I find it desirable to have a firm engagement of the attachment at this point. This can be secured by means of rivets and the like. However, these would deface and mutilate the spoon. I prefer to braze or solder my attachment in place substantially as shown in Figures 3 and 4.

The attachment 16 should be made of material having inherent resilient qualities. One of the best metals I have found for this purpose is Monel metal. However any brass, copper or steel material which would have a certain amount of resiliency before it became distorted could be used with equal satisfaction.

Disposed at the rear end of attachment 16 I have provided two downwardly extending lugs as 18 and 20. In some forms it might be desirable to form these lugs as a single lug of equal extent with a small depression at 22 which will accommodate the shank of hook 14. I further provide that at 24 a depression is formed which as normally used will be extending upwardly as viewed in the various views which will be of such an extent as to form a seat between the ledge 24 and the downwardly extending lugs 18 and 20 which will be just sufficient to accommodate the ring or eye 26 of the hook it is desired to use. When so arranged the hook is secured against rearward or forward movement in addition to being held secure against twisting about its longitudinal axis. In this manner the hook can be definitely positioned with respect to the angle its plane makes with the plane of the spoon. This is a very desirable characteristic of this construction and the exact positioning of the eye 26 is further very essential to provide proper balance and to insure the desired resultant action of the spoon.

It has been found desirable to have attachment 16 of sufficient width to fully cover the eye 26. In this connection it is desired to point out that the various features enumerated are quite essential to the successful operation of this device. This device is not intended primarily as a component part of a spoon. It is rather intended to be an attachment for securing to spoons to adapt them to this desirable principle. It will be clear it is believed that all that is required to convert the usual type of spoon which has the hook 14 looped into opening 12 by means of a ring is to remove that ring completely, to pass the hook thru the ring opening 12 so that it is substantially as shown in Figure 2. Then to secure preferably by soldering thereto, which is a comparatively simple means, the attachment 16 to the body of the spoon, it being necessary to retain the proportions substantially shown in Figure 3. In this way the spoon can be used after the principles of this illustration yet by removing member 16 and replacing the hook ring, the spoon can be used as before. In this way it makes it possible for the average sportsman to obtain double service out of his spoons.

*Method of operation*

When a spoon having embodied therein my attachment is being put to use it is first necessary to place hook 14 in the position shown in Figures 1 and 3 in which the hook is well up upon the spoon body and the eye of the hook is firmly engaged by ridge 24 and the lugs 18 and 20. In this way it will be held secure for all normal use. Then as the spoon is used and a fish strikes the spoon the first action normally would be either to force the barbed end of the spoon as 28 sideways or to force the entire hook rearwardly. Either action will result in the springing upwardly of the loose end of the attachment 16 so that the hook will be free, then the hook being free is much more difficult for the fish to throw out of his mouth. In case of a hook which is fixedly secured to a spoon there is some resistance for him to work against and the result is quite often that the hook is torn out of the mouth before it bites deeply into the flesh. In the present instance tho there is but an instant that the hook is free then as the spoon by means of the line is continually being taken in its original direction the eye 26 comes sharply up against the spoon body at 12 where its further travel is arrested. This tends to seat the hook deeply into the flesh of the fish and further escape is very improbable.

The foregoing description and the accompanying drawing are believed to clearly disclose a preferred embodiment of my invention but it will be understood that this disclosure is merely illustrative and that such changes in the invention may be made as are fairly within the scope and spirit of the following claim.

I claim:—

The combination with a trolling spoon and a hook having an eye and slidably attached to the spoon, of a spring blade attached at one end to the spoon, an offset ledge on the opposite, free end of the blade to frictionally engage over said eye, and a pair of spaced lugs on the inner side of said ledge for straddling the hook, and frictionally engaging the eye at opposite sides of the longitudinal center of the hook.

JOHN L. MOILANEN.